(12) United States Patent
Arrar

(10) Patent No.: US 7,508,316 B1
(45) Date of Patent: Mar. 24, 2009

(54) PORTABLE INTERACTIVE ISLAMIC PRAYER COUNTER

(76) Inventor: Raed Basheer Jamil Arrar, Rua Itapaiuna, 1800, Apt. 191P, CEP: 05707-001, Morumbi, Saõ Paulo (BR)

( * ) Notice: Subject to any disclaimer, the term of this patent is extended or adjusted under 35 U.S.C. 154(b) by 0 days.

(21) Appl. No.: 12/128,062

(22) Filed: May 28, 2008

(51) Int. Cl.
G08B 21/00 (2006.01)
G08B 1/08 (2006.01)
G08B 23/00 (2006.01)
G09B 19/00 (2006.01)

(52) U.S. Cl. ............... 340/686.6; 340/502; 340/539.11; 434/245

(58) Field of Classification Search .............. 340/686.1, 340/686.6, 693.6, 693.7, 500–502, 539.11, 340/539.23, 540, 573.1, 321; 434/245; 5/417
See application file for complete search history.

(56) References Cited

U.S. PATENT DOCUMENTS

| | | | |
|---|---|---|---|
| 3,806,911 A | 4/1974 | Pripusich | |
| 4,601,584 A | 7/1986 | DeWolf et al. | |
| 5,505,622 A | 4/1996 | Bosmani | |
| 6,540,519 B2 | 4/2003 | Wexler | |
| 6,783,822 B1 | 8/2004 | Faouaz | |
| 7,126,483 B2 * | 10/2006 | Zarouri | 340/573.1 |
| 2003/0086521 A1 | 5/2003 | Rana | |
| 2007/0292827 A1 | 12/2007 | Forbath | |

FOREIGN PATENT DOCUMENTS

| | | | |
|---|---|---|---|
| GB | 2263023 A | | 7/1993 |
| GB | 2414336 A | * | 11/2005 |
| WO | 2007/104321 A1 | | 9/2007 |

OTHER PUBLICATIONS

"Muslim Prayer Counter"—http://aliceliu83.ec51.com/offer/382888.html.
"LCD Counter/Tally Counter Electronic"—http://www.islamicgoodsdirect.co.uk/product_info.php/products_id/2453.

* cited by examiner

Primary Examiner—Benjamin C Lee
Assistant Examiner—Jennifer Mehmood
(74) Attorney, Agent, or Firm—Alvin R. Wirthlin

(57) ABSTRACT

An interactive electronic prayer counter that indicates a current or completed Rakah of a plurality of Rakat performed by a user during an Islamic ceremonial prayer includes a display for indicating a prayer or Rakah count, a first proximity sensor for sensing when a Sudjood position has been assumed by the user, and a processor operably associated with the indicator and first proximity sensor for updating the indicator to the next Rakah. In this manner, the user is informed of his or her progress during the Islamic ceremonial prayer. The first proximity sensor is capable of sensing the Sudjood position without physical contact by the user. A second proximity sensor can also be provided to detect a particular stage of the prayer cycle for updating the display.

16 Claims, 7 Drawing Sheets

PORTABLE INTERACTIVE ISLAMIC PRAYER COUNTER

BACKGROUND OF THE INVENTION

This invention relates to electronic display devices, and more particularly to a portable interactive electronic prayer counter that displays the current and/or next prayer count based on sensed movements by a user during Islamic prayer rituals.

Throughout the world, Muslims are required to offer ritual prayers five times per day. The morning prayer known as "Fajr" can be performed any time between the breaking of the dawn till just before sunrise. The noon prayer known as "Zuhr" can be performed any time after the sun declines from its zenith until about mid-afternoon. The afternoon prayer known as "Asr" can be performed any time soon after the Zuhr prayer time ends until just before sunset. The evening prayer known as "Maghrib" can be performed any time just after sunset to an hour and a half after sunset. The night prayer known as "Isha" can be performed any time shortly after the Maghrib prayer time ends until dawn.

Each ritual prayer includes a plurality of cycles or "Rakat." Each Rakah requires a person to assume a specific sequence of movements including: "Iqama" wherein the person stands in an upright position facing the Kaba or Mecca; "Ruk'u" wherein the person bows with a straight back and hands on knees; "Qauma" wherein the person rises from the bending position to a standing position with arms at the side; first "Sudjood" wherein the person assumes a prostrate position with the feet, knees, palms of both hands, forehead and tip of the nose touching the clean ground; "Qu'ud" wherein the person rises to a sitting position with head bowed; second "Sudjood" wherein the person again assumes the prostrate position; and then again to the "Iqama" position to begin a new cycle or Rakah. During the Rakah, the person recites specific passages of the Quran and may offer additional words of a more personal nature.

Since the person must repeat the Rakah a plurality of times, and further since the person recites passages from the Quran, it sometimes becomes difficult for the person to remember which Rakah is being performed. Once forgotten, the person must go back and perform additional Rakah to ensure that at least the proper number has been performed.

In order to overcome this problem, UK Patent Application No. GB 2,263,003 to Khatri and U.S. Pat. No. 6,783,822 to Faouaz have proposed prayer mats with a built-in switch and display for indicating which Rakah is being performed. Such devices require the user to place his or her forehead directly on the switch in order to advance the Rakah count on the display. However, such devices may be distracting to a user since focus must be diverted from the ritual prayer being performed to the particular placement of the forehead on the mat.

In addition, the prayer mats of such devices are unwieldy and difficult to carry when traveling from one place to another, especially when the user must perform ritual prayers at different places during the day, such as at home, work, school, and so on. Since many users already have prayer mats, there is little desirability in purchasing an additional prayer mat solely to keep track of the number of Rakat being performed.

It would therefore be desirous to provide an Islamic prayer counter that may readily fit into a pocket or otherwise be carried by a user in a non-obtrusive manner for transportation between ritual prayer times. It would be further desirous to provide an Islamic prayer counter that eliminates the need to precisely position the forehead on the switch in order to advance the Rakah count.

BRIEF SUMMARY OF THE INVENTION

According to one aspect of the invention, an interactive electronic prayer counter that indicates a current or completed Rakah of a plurality of Rakat performed by a user during an Islamic ceremonial prayer is provided. The prayer counter includes an indicator for indicating a prayer or Rakah count, a first proximity sensor for sensing when a Sudjood position has been assumed by the user, and a processor operably associated with the indicator and first proximity sensor for updating the indicator to the next Rakah. In this manner, the user is informed of his or her progress during the Islamic ceremonial prayer. The first proximity sensor is capable of sensing the Sudjood position without physical contact by the user.

According to a further aspect of the invention, a portable interactive electronic prayer counter for indicating a current or completed Rakah of a plurality of Rakat performed by a user during an Islamic ceremonial prayer is provided. The prayer counter includes a housing having a length, width and thickness sufficiently small to fit within a pocket or wallet of user, a display located on the housing for displaying a prayer or Rakah count, a first proximity sensor associated with the housing for sensing when a Sudjood position has been assumed by the user without physical contact between the user and the first proximity sensor, a user-actuable switch for programming the prayer counter with one of a plurality of Islamic ceremonial prayer modes, and a microcontroller operably associated with the display and the first proximity sensor for updating the display to indicate a next Rakah to be performed. In this manner, the user is informed of his or her progress during the Islamic ceremonial prayer.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
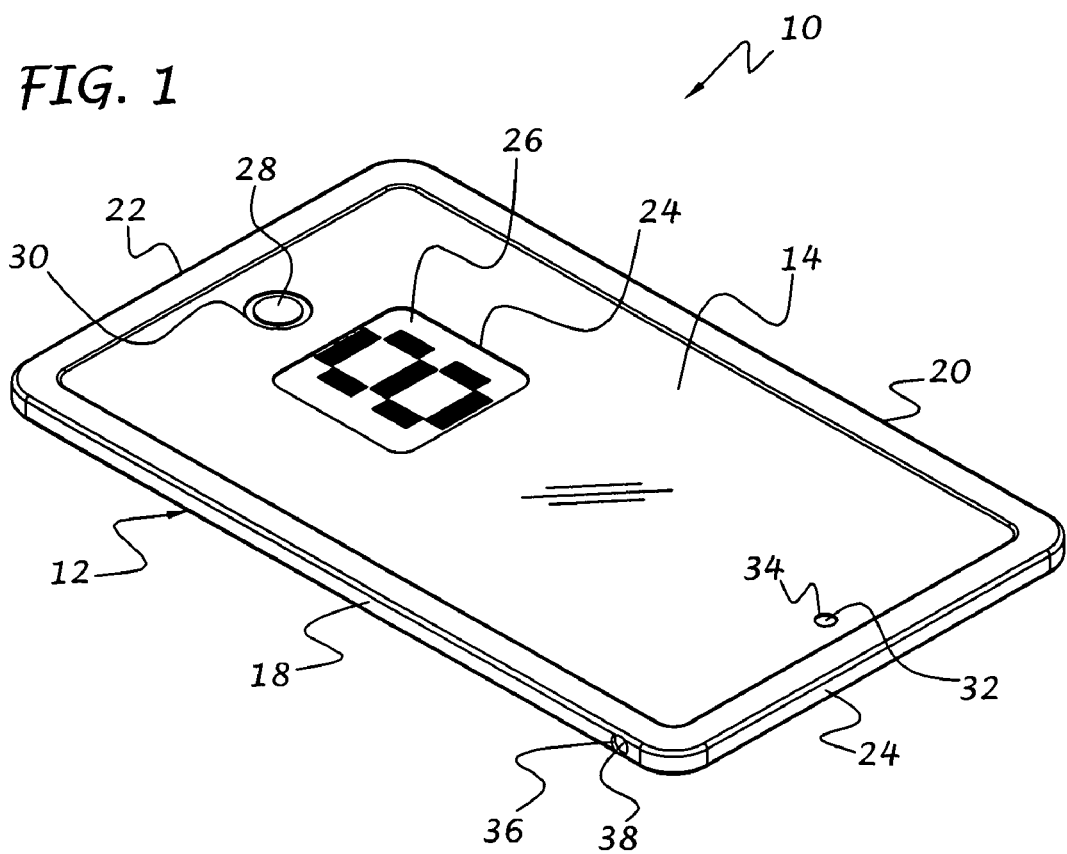
FIG. 1 is a top isometric view of a portable electronic prayer counter in accordance with the present invention.
Figure 2:
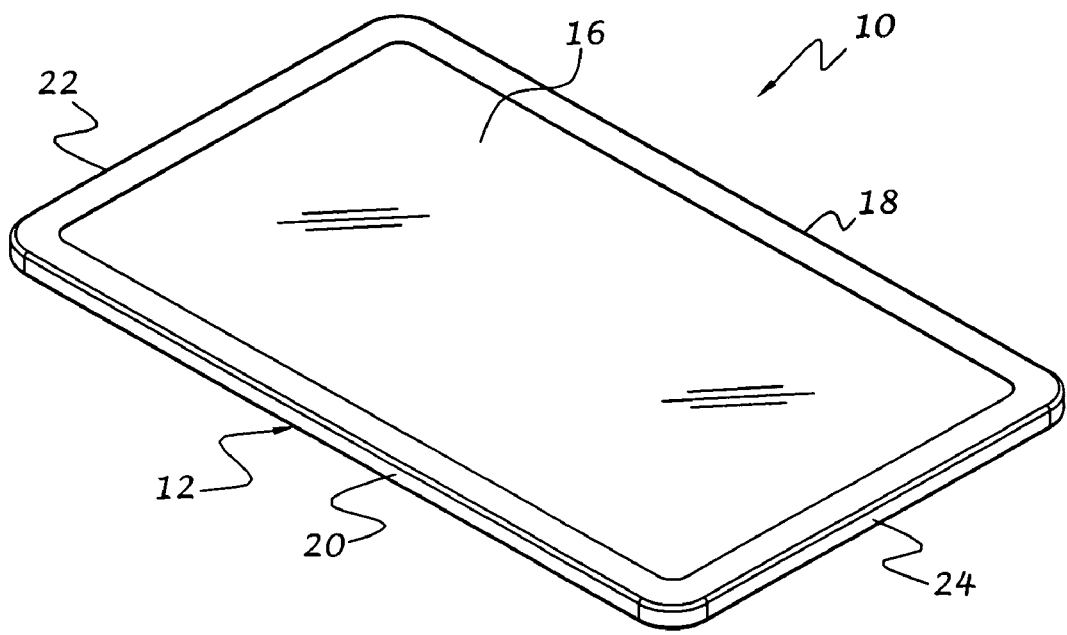
FIG. 2 is a bottom isometric view thereof.

Referring to the drawings, and to FIGS. 1-2 in particular, a portable interactive electronic prayer counter 10 in accordance with an exemplary embodiment of the present invention is illustrated. The electronic prayer counter 10 preferably includes a housing 12 having a front panel 14, a rear panel 16, side walls 18, 20 extending between the front and rear panels, and a top wall 22 and bottom wall 24 extending between the front and rear walls and the side walls to form an enclosure within which electronic components are located, as will be described in further detail below. The housing 12 is preferably approximately the same size as a credit-card, about two inches wide by about three inches long and a thickness that allows the housing 12 to fit within a pocket, wallet, purse, and so on, of a user while not in use. It will be understood that the housing 12 is not limited to the particular dimensions as described but may greatly vary over a wide range of values. The housing 12 can also be formed as a smart phone, PDA device and so on, and therefore is not limited to the sole function of counting prayer cycles. In addition, the housing can be flat or curved, flexible or stiff, can include a handle or other devices for facilitating handling of the housing, as well as other features without departing from the spirit and scope of the present invention.

A window 24 is formed in the front panel 14 of the housing 12 in alignment with an indicator 26, which as shown is in the form of an electronic display. A user-selectable switch 28 extends through an opening 30 in the front panel 14. A first proximity sensor 32 is in alignment with an aperture 34 on the front panel. Likewise, a second proximity sensor 36 is in alignment with an aperture 38 on one of the side walls 18, 20. The sensors 32 and 36 detect movement of a user during the prayer cycle or Rakah for modifying the contents on the display, without the necessity of direct contact as in the prior art devices. The housing 12 is preferably constructed of a plastic material but may be formed from any desired materials such as composites, metals, and so on. The front and/or rear panels may include images (not shown) relating to important Islamic places, instructions relating to the ritual prayers and/or use of the prayer counter 10, portions of the Quran to be recited during the Rakah, advertising, and so on.

As shown, the indicator 26 is preferably in the form of a 7-segment single digit LCD display. However, it will be understood that other displays can be used, including but not limited to: 7-segment LED displays, LCD or LED graphical displays, OLED's, TFT's, PLED character and/or graphical displays, bistable or stable displays that display an image with little or no electrical power, or technology yet to be developed. The display may show any kind of indication for informing the user of his or her progression during the Rakah cycle. By way of example, the display may show numerals, letters or combinations thereof in different languages including English, Arabic, Turkish, Chinese, as well as other languages, as well as characters or icons, and so on. It will be further understood that other indicators can be used either alone or in conjunction with the display, such as piezo-electric buzzers or chimes, speakers, tactical touch devices for the visually impaired, and so on.

Figure 3:
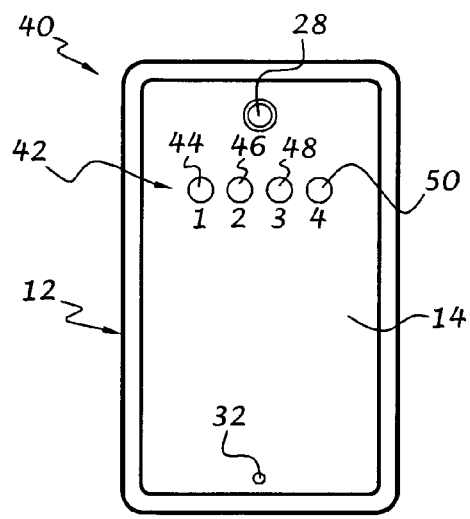
FIG. 3 is a top plan view of a portable prayer counter in accordance with another embodiment of the invention.

Turning now to FIG. 3, a portable interactive electronic prayer counter 40 in accordance with a further embodiment of the invention is illustrated. The prayer counter 40 is similar in construction to the prayer counter 10 previously described, with the exception that the indicator 42 is in the form of four separate LED's 44, 46, 48 and 50 that extend through the front panel 14 of the housing 12 in a linear pattern. Each LED 44-50 may be associated with a numeral, such as numerals 1, 2, 3 and 4, respectively, to indicate the particular prayer cycle or Rakah being performed or that has been or will be performed, upon illumination of one or more of the LED's. However, it will be understood that the LED's may be provided without numerals. It will be further understood that more or less LED's can be used and that such LED's can be arranged in any pattern on the front panel 14.

Figure 4:
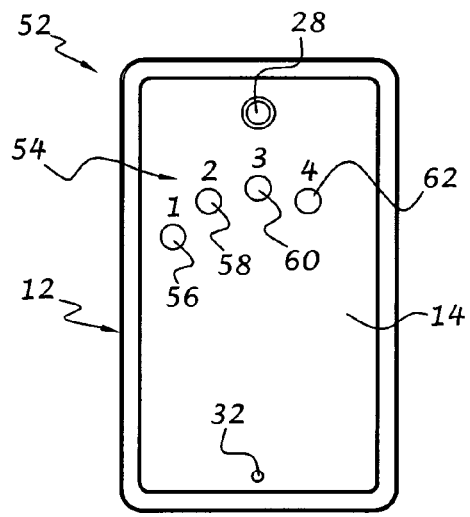
FIG. 4 is a top plan view of a portable prayer counter in accordance with a further embodiment of the invention.

By way of example, and referring now to FIG. 4, a portable interactive electronic prayer counter 52 in accordance with a further embodiment of the invention is illustrated. The prayer counter 52 is similar in construction to the prayer counter 40 previously described, with the exception that the indicator 54 is in the form of four separate LED's 56, 58, 60 and 62 that extend through the front panel 14 of the housing 12 in an arcuate pattern. As in the previous embodiment, numerals 1, 2, 3 and 4 can be associated with each LED 56-62, respectively.

Figure 5:
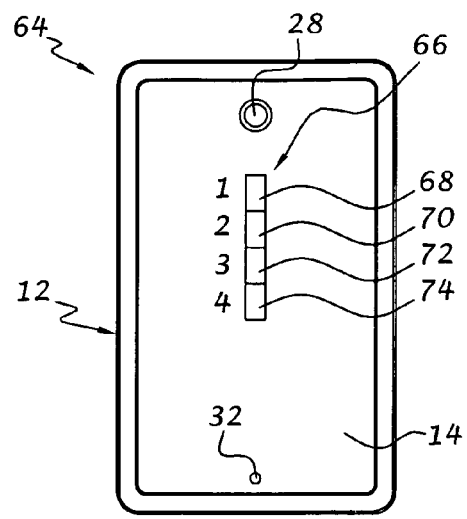
FIG. 5 is a top plan view of a portable prayer counter in accordance with yet another embodiment of the invention.

Referring now to FIG. 5, a portable interactive electronic prayer counter 64 in accordance with another embodiment of the invention is illustrated. The prayer counter 64 is similar in construction to the prayer counter 40 previously described, with the exception that the indicator 66 is in the form of a bargraph display with four separate illuminating elements 68, 70, 72 and 74 that extend through the front panel 14 of the housing 12 in a linear pattern. The bargraph can be formed as separate LED's or as an LCD display panel with different segments.

Figure 6:
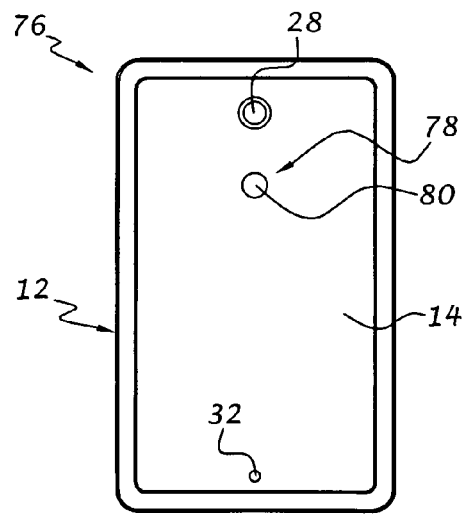
FIG. 6 is a top plan view of a portable prayer counter in accordance with yet a further embodiment of the invention.

Turning now to FIG. 6, a portable interactive electronic prayer counter 76 in accordance with another embodiment of the invention is illustrated. The prayer counter 76 is similar in construction to the prayer counter 40 previously described, with the exception that the indicator 78 is in the form of a single LED 80 or other illuminating element. During operation, the LED 80 can flash a particular number of times followed by a pause to indicate the particular Rakah being performed or that will be performed.

Figure 7:
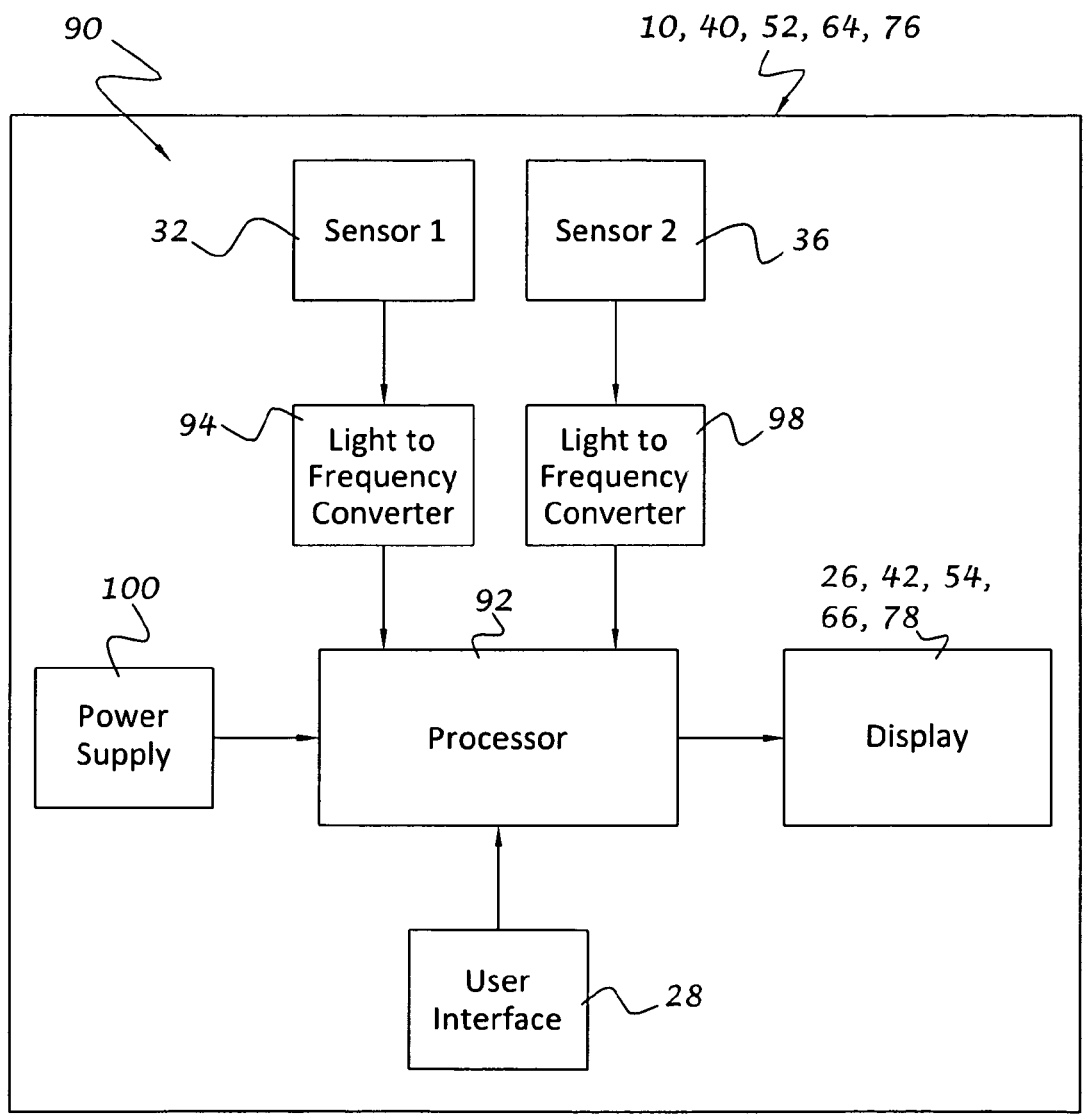
FIG. 7 is a schematic block diagram of the electronics section of the portable prayer counter.

With additional reference to FIG. 7, a schematic block diagram of the electronics section 90 of the portable prayer counter, such as 10, 40, 52, 67 and 76, is illustrated. The electronics section 90 preferably includes the first and second proximity sensors 32 and 36 connected to a processor 92 via a light to frequency converter 94 and 98, respectively. A Rakah count indicator, such as 26, 42, 54, 66 or 78 is also connected to the processor 92 together with a power supply 100 for powering the electronics and the user interface 28. The power supply 100 may also be connected to the other electronic components. In accordance with one preferred embodiment of the invention, the indicator is a seven-segment single digit LCD display that is driven by the processor 92 in response to signals received by one or both proximity sensors 32, 36, as will be described in further detail below. A suitable processor is provided by Sitronix of Chupei City, Hsinchu, Taiwan as part number ST2016, ST2064, which preferably includes a 16-bit or 8-bit microcontroller with integrated LCD display driver circuitry, memory, a programmable sound generator, as well as other features. However, it will be understood that other controllers, processors or circuitry with discrete components can be used to generate a visual and/or audio display in response to inputs from one or both of the proximity sensors.

Each sensor 32, 36 preferably comprises a passive infrared (IR) device that senses the presence of absence of thermal energy over a predetermined distance or range. In the present embodiment, the sensitivity of the sensor is preferably chosen or adjusted to sense the presence of the user when positioned within approximately a predetermined range of the prayer counter. In this manner, spurious signals that may be generated by other persons, animals, objects or random events can be minimized or eliminated to thereby accurately display the current Rakah count without interference from the surrounding environment. It will be understood that the particular detection distance between the user and each sensor can greatly vary. Each light to frequency converter 94 and 98 interfaces between the proximity sensor 32 and 36, respectively, in order to provide a digital signal to the processor 92. Preferably, each converter 94, 98 includes a 555 timer whose frequency varies in response to the intensity of light received or detected by its associated sensor 32, 36. A threshold frequency value can be set in the processor for determining when a user has moved in sufficiently close proximity to the portable prayer counter to justify actuating a change in the display. By way of example, depending on lighting conditions, and whether or not the user is sitting with the prayer counter 10 on his or her lap (such as when the user's physical disabilities would prevent full movement between standing and prostrate positions) or standing at the beginning of the prayer cycle with the prayer counter 10 located on the floor, mat rug, and so on, the detection distance can be dynamically adjusted through the software routine to select the ideal detection distance or trip point.

It will be understood that the IR proximity sensors may be integrated with frequency circuitry to convert the resulting analog signal to a frequency signal that can be interpreted by the processor. Where the processor includes one or more analog ports, the converters 94, 98 can be eliminated and the output of the IR sensors can be directly connected to the analog ports. It will be further understood that one or both sensors may be flexibly connected to the housing 10 so that the sensor(s) can be adjusted for ideal operating conditions.

It will be further understood that the present invention is not limited to passive IR-type proximity sensors but can include non-contact sensors or switches of any well-known type, such as reflective photocells, laser rangefinders, active or passive sonar, radar, passive optical devices (such as CCD's), capacitive devices, magnetic devices, inductive devices, RFID tags and receivers, and so on. In the case where RFID technology is used, the receiver would be located in the housing 12 and an RFID tag would be carried by the person while performing the ceremonial prayers. Movement of the person could then be selected based on the signal strength of the RFID tag as detected by the receiver.

The user interface 28 or user-selectable switch, is preferably of the membrane-type. However, it will be understood that other switch-type devices can be used including, without limitation, push-button switches, slide switches, potentiometers, single pole-multi-throw switches, capacitive or resistive touch sensors, and so on.

In accordance with a further embodiment of the invention, the proximity sensor can operate as a selection switch when the user's hand, such as a thumb or finger, is placed close to the sensor at start-up and while in the programming mode, to eliminate the separate switch 28.

The power supply 100 is preferably in the form of an ultra-thin printed battery and can be of the single-use or rechargeable type. Alternatively, the power supply 100 can comprise one or more solar cells, button cells, electrical power from a wall or line transformer, or the like. In accordance with one embodiment of the invention, the prayer counter 10 is preferably disposable when the battery power is drained. In accordance with a further embodiment of the invention, the battery can be rechargeable.

It will be understood that the proximity sensors 32, 36, user interface 28, indicator 26, 42, 54, 66, or 78, can be located at other positions on the housing 12. It will be further understood that one of the proximity sensors 32, 36 can be eliminated where one sensor is capable of detecting particular user movements, as will be described in greater detail below.

Figure 8:
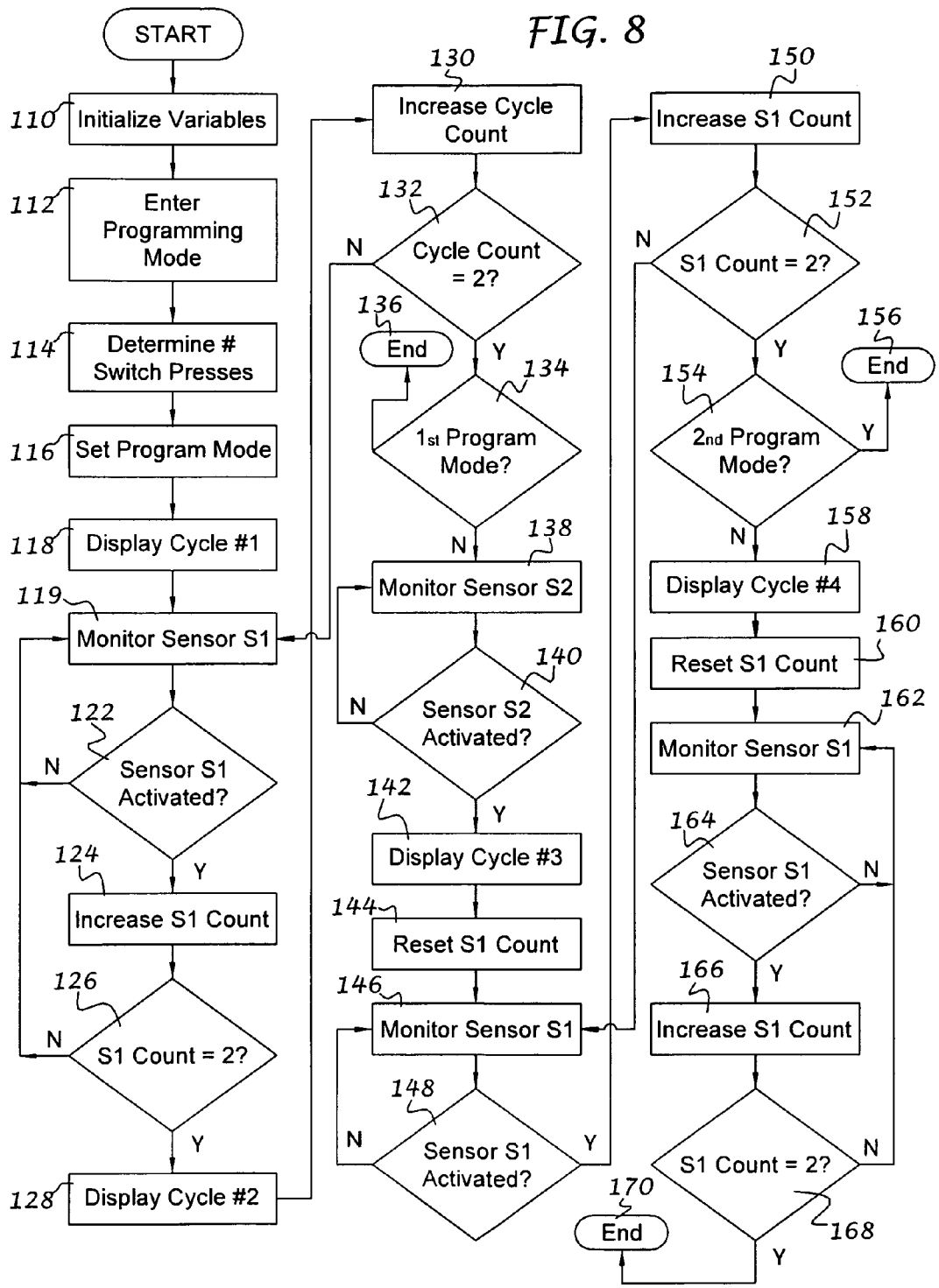
FIG. 8 is a schematic flow diagram of a method for counting and displaying prayer cycles during different prayer modes.
Figure 9:
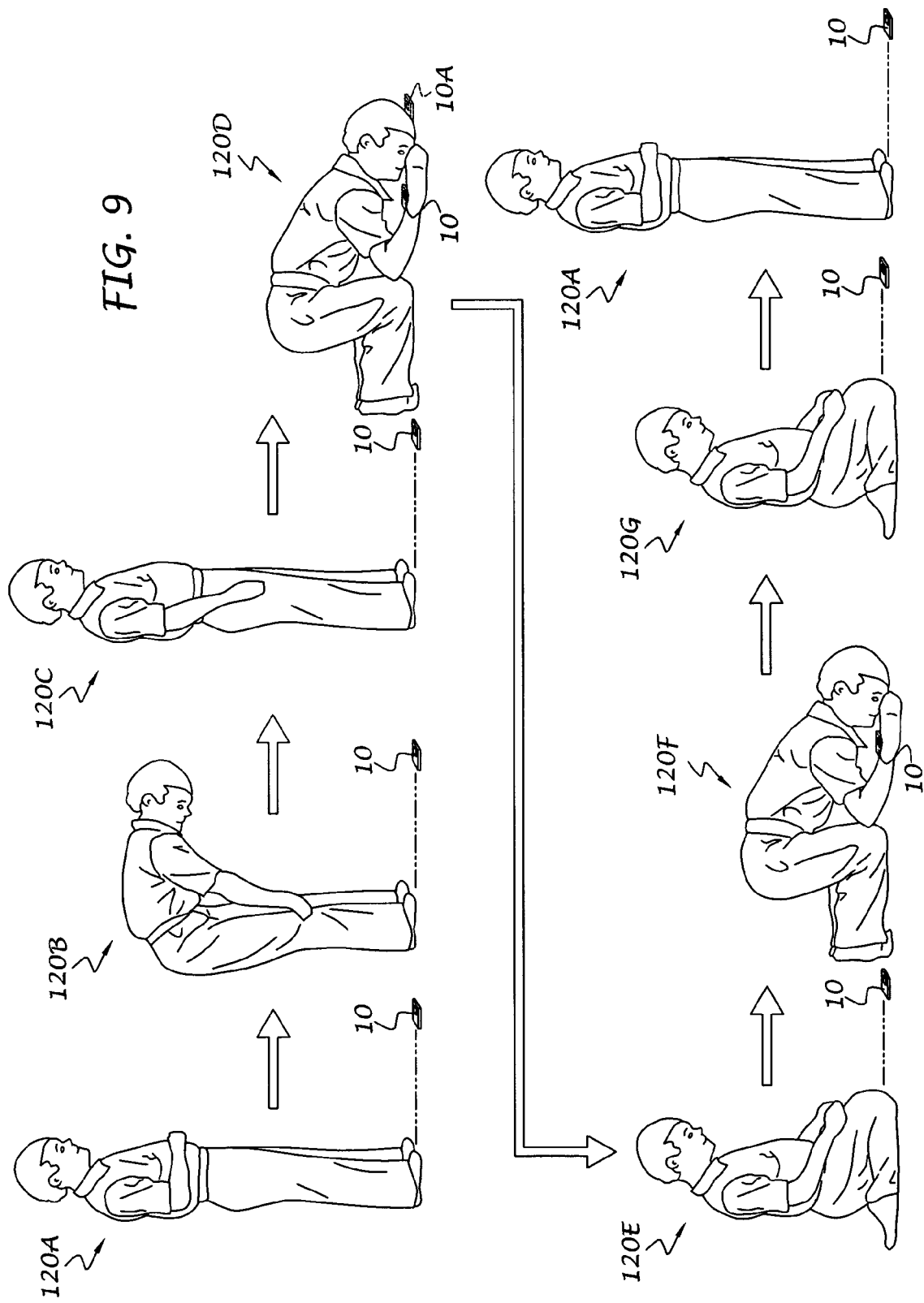
FIG. 9 illustrates use of the portable prayer counter during a prayer cycle which involves the user assuming several different sequential positions.
Figure 10:
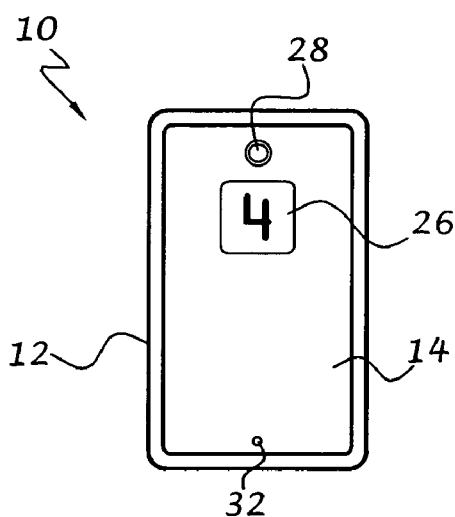
FIGS. 10-12 show a top plan view of the portable prayer counter in different programming modes to select two, three or four prayer cycles.
Figure 11:
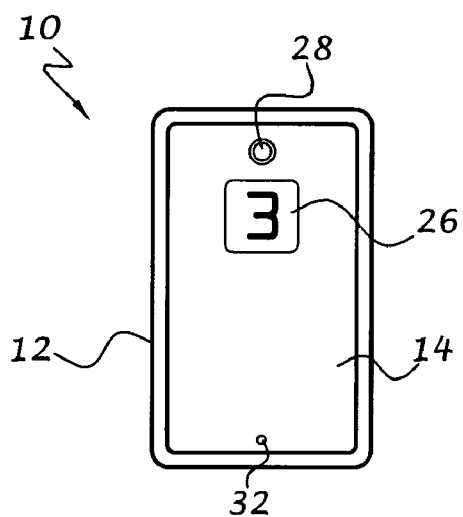
Figure 12:
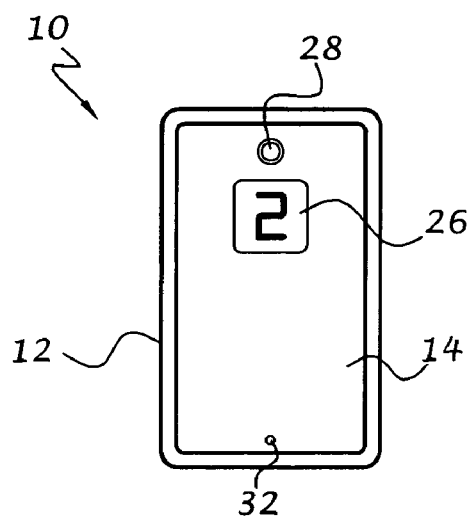

Referring now to FIGS. 8-16, a method of operating the portable interactive electronic prayer counter 10 will now be described, it being understood that the method applies as well to the other prayer counter embodiments, including smart phones, PDA's, and other electronic display devices with the capability of displaying the required Rakah counts and detecting movement of the user during the Islamic ceremonial prayers or Rakat. Initially, the prayer counter is in the "off" or "sleep" mode. When the switch 28 is pressed by a user, the prayer counter wakes up and all variables are initialized in a well-known manner, as shown at block 110 in FIG. 8. The prayer counter then enters the programming mode as shown at block 112. Initially, the default value for the number of Rakat is preferably set to four. Accordingly, the indicator 26 preferably displays a value of "4" as shown in FIG. 10, to show the number of Rakat to be performed. It will be understood that the default value is by way of example only and can be set to "0", "2", "3", or any number associated with the number of Rakat to be performed during a ceremonial prayer. At block 114, the processor determines the number of switch actuations that have occurred within a preset time period. If for example the switch has not been actuated within the preset time period, the programming mode is set, as shown at block 116, to count four Rakat. If however the switch has been actuated once within the preset time period, the value of "3" will be displayed as shown in FIG. 11. If no other switch actuations are detected during the preset time period, the programming mode is set to count three Rakat. If the switch has been actuated twice within the preset time period, the value of "2" will be displayed as shown in FIG. 12 and the programming mode is set to count two Rakat. It will be understood that the present invention is not limited to a descending count from "4" to "2" but also encompasses sequentially showing on the display 26 ascending or descending numerals depending on the particular number of switch actuations, as well as the particular default value programmed into the prayer counter 10.

Figure 13:
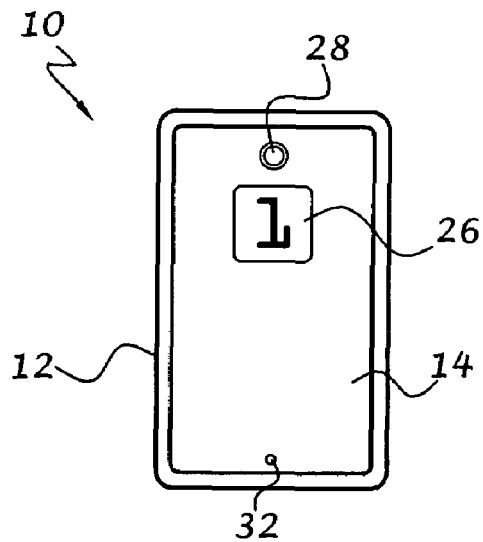
FIGS. 13-16 show a top plan view of the portable prayer counter displaying different prayer cycles of the user.
Figure 14:
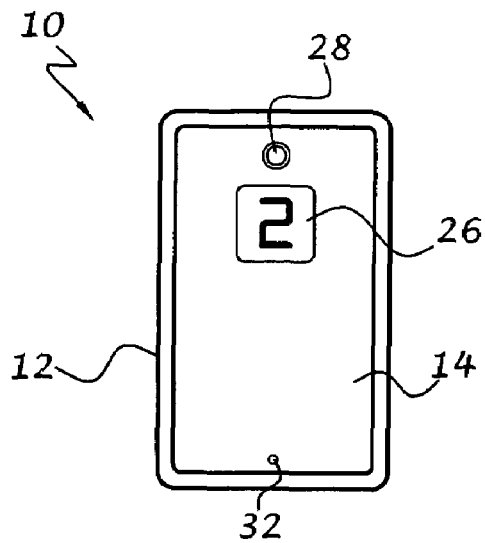
Figure 15:
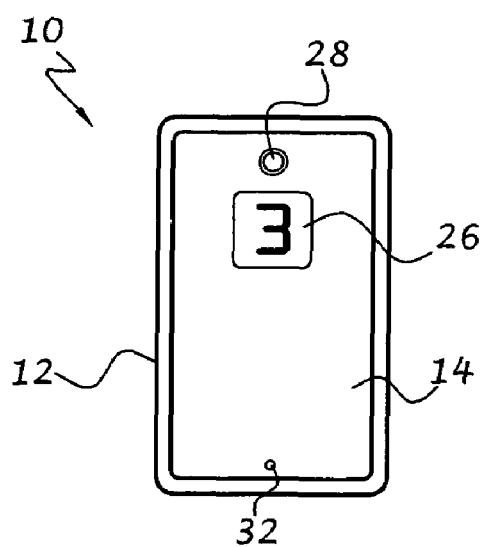
Figure 16:
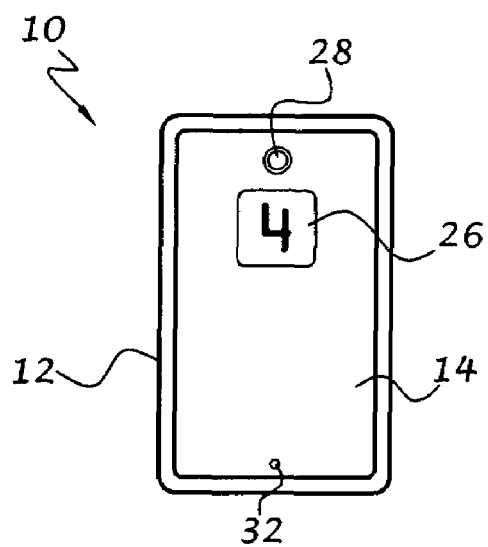

Once the program mode has been set at block 16 in FIG. 8, the Rakah cycle "1" is displayed on the display 26, as shown at block 118 and in FIG. 13, to indicate that the user is in the process of performing the first Rakah. It will be understood that the Rakah cycle can alternatively be displayed as "0" so that the display only shows the number of Rakat completed. It will be further understood that the display 26 can alternatively initially display the number of Rakat to be performed, such as "4", then count down to the value of "1" or "0" as each Rakah is completed.

Once the value "1" has been displayed in accordance with the present example, the user faces the Qibla or Mecca position and places the prayer counter 10 on the floor in front of him or her a predetermined distance, as shown in FIG. 9, for detecting the proximity of the user as the Rakah progresses. In the event that the user has physical limitations which require being seated during the Rakah cycle, the prayer counter 10 can be positioned on the lap of the user. The first sensor 32 is then continuously monitored to determine a proximal position of the user, as shown at block 119 in FIG. 8. The processor can be used in conjunction with the first sensor 32 and/or second sensor 36 to measure ambient light conditions and dynamically adjust the sensitivity of the sensor during the Rakah for adjusting a trip point for a particular user depending on where the prayer counter 10 is placed. By way of example, the trip point for detecting a user may be dynamically set when the sensor detects a change in ambient light conditions, such as when a user bows toward the card. The trip point can be any value that allows a change in the display when a certain even has occurred, as will be described in greater detail below. By way of example, a trip point for changing the display or actuating a further processing step may occur when a body part of the user is spaced a distance from the sensor of say 1 cm, 5 cm, 10 cm, 20 cm, 50 cm or more. It will be understood that the particular distances are by way of example only and may vary over a wide range of values.

Once the prayer counter 10 is properly positioned, the user then begins the prayer cycle or Rakah by assuming the "Iqama" position 120A (FIG. 9) wherein the person stands in an upright position facing the Kaba or Mecca. Subsequently, the user assumes the "Ruk'u" position 120B wherein the person bows with a straight back and hands on knees. The "Qauma" position 120C is then assumed wherein the person rises from the Ruk'u position with arms at the side. The user then takes the first "Sudjood" position 120D wherein the person adopts a prostrate position wherein the feet, knees, palms of both hands, forehead and tip of the nose touch the clean ground. In this position or at least close to this position, the electronic prayer counter 10 senses the presence of the user, as shown at block 122 in FIG. 8. The location of the prayer counter 10 is shown just under the chest area of the user and behind the user's chin. However, the prayer counter 10 can be placed at any location where the Sudjood position 120D will be detected, such as shown at 10A in FIG. 9.

When the Sudjood position 120D has been detected by the first proximity sensor 32, the first proximity sensor count S1 is increased by one, as shown at block 124 (FIG. 8). It is then determined at block 126 whether or not the S1 count equals two. If not, the first proximity sensor continues to be monitored at block 119. During each Rakah, the user must, among other requirements, assume the Sudjood position twice before the Rakah is finished. After the first Sudjood position 120D, the user then rises to the "Qu'ud" position 120E (FIG. 9), which is a sitting position with head bowed, and then assumes the second Sudjood position 120F wherein the user is again prostrate. When the processor 92 (FIG. 7) has detected another activation of the first proximity sensor at block 122 (FIG. 8), the S1 count is increased at block 124 and it is determined at block 126 that the S1 count equals two. The cycle or Rakah number is then increased to the value of "2" as shown at block 128 (FIG. 8) and on the display 26 of FIG. 14. The value "2" indicates to the user that the second Rakah cycle has begun. Subsequently, the user assumes the second Qu'ud position 120G and then rises to the Iqama position 120A to begin a new prayer cycle or Rakah.

As a new Rakah begins, a cycle count is increased at block 130 (FIG. 8). At block 132 it is determined whether the cycle count equals a value of two. If not, the first sensor is again monitored to determine if the first and second Sudjood positions 120D and 120F, respectively, have been assumed by the user. When it has been determined that the cycle count equals the value of two at block 132, it is then determined at block 134 whether or not the first program mode has been set by the programming sequence 112-114 as previously described. If the first programming mode has been set, which refers to an Islamic ceremonial prayer with two Rakat, the process ends, as shown at block 136, and the electronics go into the sleep or off mode.

If it has been determined that the cycle count equals the value of two at block 134 and the programming mode has been set to the second or third mode, which refers to three or four Rakat to be performed, respectively, the second proximity sensor 36 is monitored at block 138. After the second Qu'ud position 120G (FIG. 9) of the second Rakah, the user does not stand up as in the first Rakah but rather remains seated to read a small part of the Quran. Once this step has been completed, and as the user begins to stand up, the second proximity sensor 36 will detect movement of the user's hands moving close to the second sensor. If the first proximity sensor 32 is capable of detecting this movement, then the second sensor 36 can be eliminated and the process can continue with only the sensor 32. If it has been determined at block 140 that the second sensor has been activated, the value of "3" is shown on the display (block 142 and FIG. 15), indicating that the third Rakah has commenced. The first sensor count S1 is then reset at block 144 and the first sensor is again monitored at block 146.

The user then begins the prayer cycle or Rakah for the third time by assuming the Iqama position 120A (FIG. 9), then the Ruk'u position 120B, the Qauma position 120C, then the first Sudjood position 120D. In this position or at least close to this position, the first sensor 32 of the electronic prayer counter 10 senses the presence of the user, as shown at block 148 in FIG. 8. When the Sudjood position 120D has been detected by the first proximity sensor 32, the first proximity sensor count S1 is increased by one, as shown at block 150 (FIG. 8). It is then determined at block 152 whether or not the S1 count equals two. If not, the first proximity sensor continues to be monitored at block 146. After the first Sudjood position 120D has been taken, the user then rises to the Qu'ud position 120E (FIG. 9) and then assumes the second Sudjood position 120F. When the processor 92 (FIG. 7) has detected a second activation of the first proximity sensor 32 at block 148 (FIG. 8), the S1 count is increased at block 150 and it is determined at block 152 that the S1 count equals two. It is then determined at block 154 whether or not the second program mode has been set by the programming sequence 112-114 as previously described. If the second programming mode has been set, which refers to an Islamic ceremonial prayer with three Rakat, the process ends, as shown at block 156, and the electronics go into the sleep or off mode. If the third programming mode has been set, which refers to an Islamic ceremonial prayer with four Rakat, the cycle or Rakah number is then increased to the value of "4" as shown at block 158 (FIG. 8) and on the display 26 of FIG. 16. The count value S1 of the first sensor 32 is then reset at block 160. The value "4" indicates to the user that the fourth Rakah cycle has begun. Subsequently, the user assumes the second Qu'ud position 120G and then rises to the Iqama position 120A to begin the fourth prayer cycle or Rakah.

As the user progresses through the fourth Rakah, the first proximity sensor 32 continues to monitor movement at block 162. If the sensor 32 has been activated, as determined at block 164, the count value S1 is increased by one at block 166. If the S1 count value equals two at block 168, the process ends, as shown at block 170, and the electronics go into the sleep or off mode. If the S1 count value does not equal two, the first proximity sensor continues to be monitored.

Accordingly, the present invention provides a portable electronic prayer counter that may readily fit into a pocket or otherwise be carried by a user in a non-obtrusive manner for transportation between ritual prayer times and also eliminates the need to precisely position the forehead on the switch in order to advance the Rakah count.

It will be understood that the above-described process can be embodied as computer software downloadable from any type of media including memory sticks, disks, the Internet, personal computers, and so on, into any desired device or format to take advantage of sensors that may be already be incorporated into such devices. By way of example, some smart phones may have a proximity sensor for detecting when the phone is placed next to the ear to turn off the display screen. The proximity sensor in such phones can be used to keep the display screen on and accomplish the above-described process.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. By way of example, the above-described process can be combined with Mecca-finding features and the display can be illuminated when the user has pointed the device in the right direction. It will be understood, therefore, that this invention is not limited to the particular embodiments disclosed, but is intended to cover modifications within the spirit and scope of the present invention as defined by the appended claims.

I claim:

1. A method for indicating a current or completed Rakah of a plurality of Rakat performed by a user during an Islamic ceremonial prayer, the method comprising: providing a prayer counter with
    an indicator for indicating a prayer count;
    a first proximity sensor for sensing when a Sudjood position has been assumed by the user, the first proximity sensor sensing the Sudjood position without physical contact by the user; and
    a processor operably associated with the indicator and first proximity sensor for updating the indicator to the next Rakah thereby informing the user of the user's progress during the Islamic ceremonial prayer;
    programming the prayer counter with one of a plurality of Islamic ceremonial prayer modes, the plurality of prayer modes including a first prayer mode for performing two Rakat; a second prayer mode for performing three Rakat; and a third prayer mode for performing four Rakat; sensing the Sudjood position; and updating the indicator when the Sudjood position has been detected.

2. A method according to claim 1, and further comprising providing a housing for containing the indicator, first proximity sensor and processor, the housing being sufficiently small to fit within a wallet or pocket of the user.

3. A method according to claim 1, wherein the first proximity sensor is adapted to sense the presence of the user within a distance ranging from about 1 cm to about 50 cm.

4. A method according to claim 1, wherein the first proximity sensor senses the presence of the user and dynamically adjusts a trip point for modifying the indicator or moving to a next process step.

5. A method according to claim 1, wherein the first proximity sensor comprises an infrared sensor.

6. A method according to claim 1, wherein the first proximity sensor is selected from the group consisting of: infrared, capacitive, reflective photocell, rangefinder, active and passive sonar, radar, passive optical, magnetic, inductive, near field, and RFID sensors.

7. A method according to claim 1, and further comprising providing a second proximity sensor for sensing hand movement of the user after a Qu'ud position has occurred during a second Rakah and updating the indicator to the next Rakah to be performed.

8. A method according to claim 7, wherein the first and second proximity sensors comprise infrared sensors.

9. A method for indicating a current or completed Rakah of a plurality of Rakat performed by a user during an Islamic ceremonial prayer, the method comprising providing a prayer counter with:
    a housing having a length, width and thickness sufficiently small to fit within a pocket or wallet of a user;
    a display located on the housing for displaying a prayer count;
    a first proximity sensor associated with the housing for sensing when a Sudjood position has been assumed by the user without physical contact between the user and the first proximity sensor;
    a user-actuable switch for programming the prayer counter with one of a plurality of Islamic ceremonial prayer modes; and
    a microcontroller operably associated with the display and the first proximity sensor for updating the display to indicate a next Rakah to be performed thereby informing the user of the user's progress during the Islamic ceremonial prayer selecting one of the plurality of Islamic ceremonial prayer modes, the plurality of prayer modes including a first prayer mode for performing two Rakat; a second prayer mode for performing three Rakat; and a third prayer mode for performing four Rakat; sensing the Sudjood position; and updating the display when the Sudjood position has been detected.

10. A method according to claim 9, and further comprising providing a second proximity sensor associated with the housing for sensing hand movement of the user after a Qu'ud position has occurred during a second Rakah of the second and third prayer modes to thereby update the display to indicate the next Rakah to be performed.

11. A method according to claim 10, wherein the first and second proximity sensors comprise infrared sensors.

12. A method according to claim 10, wherein the first and second proximity sensors are selected from the group consisting of: infrared, capacitive, reflective photocell, rangefinder, active and passive sonar, radar, passive optical, magnetic, inductive, near field, and RFID sensors.

13. A portable interactive electronic prayer counter for indicating a current or completed Rakah of a plurality of Rakat performed by a user during an Islamic ceremonial prayer, the prayer counter comprising:
    a housing being of approximately the same length and width as a credit card to fit within a pocket or wallet of a user;
    a display located on the housing for displaying a prayer count;

a first proximity sensor associated with the housing for sensing when a Sudjood position has been assumed by the user without physical contact between the user and the first proximity sensor, the first proximity sensor detecting the presence of the user within a predetermined distance of no less than one centimeter;

a user-actuable switch for programming the prayer counter with one of a plurality of Islamic ceremonial prayer modes, the plurality of prayer modes comprising a first prayer mode for performing two Rakat, a second prayer mode for performing three Rakat, and a third prayer mode for performing four Rakat; and a second proximity sensor associated with the housing for sensing hand movement of the user after a Qu'ud position has occurred during a second Rakah of the second and third prayer modes; and a microcontroller operably associated with the display and the first proximity sensor for updating the display to indicate a current Rakah thereby informing the user of the user's progress during the Islamic ceremonial prayer, the microcontroller also being operably associated with the second proximity sensor to thereby update the display to indicate the next Rakah to be performed during the second and third prayer modes.

14. A method for indicating a number of remaining or completed Rakah of a plurality of Rakat performed by a user during an Islamic ceremonial prayer, the method comprising: providing an electronic prayer counter with an indicator and a non-contact sensor for sensing movement of the user without physical contact between the user and the sensor; detecting a first movement of the user with the sensor; determining that a first Sudjood position has been assumed by the user; detecting a second movement of the user with the sensor; determining that a second Sudjood position has been assumed by the user; and updating the indicator to reflect the number of remaining or completed Rakah.

15. A method according to claim 14, and further comprising: dynamically adjusting a trip point of the sensor to thereby accommodate different users.

16. A method according to claim 14, and further comprising: providing the electronic prayer counter with a user-actuable switch for selecting a particular number of Rakat to be performed by the user; detecting the particular number of Rakat selected by the user; and setting a maximum value to be displayed by the indicator based on the user selected number of Rakat.

* * * * *